(12) United States Patent
Dallenbach et al.

(10) Patent No.: US 7,451,659 B2
(45) Date of Patent: *Nov. 18, 2008

(54) GAP-CHANGE SENSING THROUGH CAPACITIVE TECHNIQUES

(75) Inventors: William D. Dallenbach, Sunnyvale, CA (US); Divyasimha Harish, Union City, CA (US)

(73) Assignee: Loadstar Sensors, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/237,060

(22) Filed: Sep. 28, 2005

(65) Prior Publication Data

US 2006/0065973 A1 Mar. 30, 2006

(51) Int. Cl.
*G01L 1/00* (2006.01)

(52) U.S. Cl. .............................. 73/780; 73/718; 73/777; 73/862.625; 73/862.626

(58) Field of Classification Search ................. 73/718, 73/777, 780, 862.625, 862.626
See application file for complete search history.

(56) References Cited

U.S. PATENT DOCUMENTS

| | | | |
|---|---|---|---|
| 3,336,525 A | 8/1967 | Church | |
| 3,646,433 A | 2/1972 | Eilersen | |
| 3,698,249 A | 10/1972 | Weaver | |
| 3,859,575 A | 1/1975 | Lee et al. | |
| 3,880,008 A | 4/1975 | Eilersen | |
| 4,042,876 A | 8/1977 | Visioli, Jr. | |
| 4,054,833 A | 10/1977 | Briefer | |
| 4,084,438 A | 4/1978 | Lee et al. | |
| 4,093,915 A | 6/1978 | Briefer | |
| 4,175,428 A | 11/1979 | Eilersen | |
| 4,227,418 A | 10/1980 | Bonner et al. | |
| 4,229,776 A | 10/1980 | Antikainen et al. | |

(Continued)

FOREIGN PATENT DOCUMENTS

DE 4330808 3/1995

(Continued)

OTHER PUBLICATIONS

"Eilersen Electric Digital Weighing Systems", http://www.eilersen.com/, 1 pg.

(Continued)

*Primary Examiner*—Edward Lefkowitz
*Assistant Examiner*—Freddie Kirkland, III
(74) *Attorney, Agent, or Firm*—Raj Abhyanker LLP

(57) ABSTRACT

A gap-change sensing through capacitive techniques is disclosed. In one embodiment, an apparatus includes a first conductive surface and a second conductive surface substantially parallel to the first conductive surface, and a sensor to generate a measurement based on a change in a distance between the first conductive surface and the second conductive surface. The change in the distance may be caused by a deflection of the first conductive surface with respect to the second conductive surface, and the deflection may be a compressive force and/or an expansive force. The sensor may apply an algorithm that converts a change in capacitance to at least one of a change in voltage and/or a change in frequency to generate the measurement. The change in the distance may be caused by a load applied to the surface above the first conductive surface with respect to the second conductive surface.

33 Claims, 10 Drawing Sheets

U.S. PATENT DOCUMENTS

| | | | |
|---|---|---|---|
| 4,358,814 A | 11/1982 | Lee et al. | |
| 4,382,479 A | 5/1983 | Lee et al. | |
| 4,383,586 A | 5/1983 | Lee | |
| 4,386,312 A | 5/1983 | Briefer | |
| 4,433,742 A | 2/1984 | Lee | |
| 4,434,203 A | 2/1984 | Briefer | |
| 4,434,451 A | 2/1984 | Delatorre | |
| 4,448,085 A | 5/1984 | Lee | |
| 4,463,614 A | 8/1984 | Lee | |
| 4,464,725 A | 8/1984 | Briefer | |
| 4,513,831 A | 4/1985 | Lee et al. | |
| 4,558,600 A | 12/1985 | Lee | |
| 4,603,308 A | 7/1986 | Briefer | |
| 4,649,759 A * | 3/1987 | Lee | 73/862.626 |
| 4,846,293 A | 7/1989 | Li | |
| 4,899,600 A | 2/1990 | Lee | |
| 4,949,054 A | 8/1990 | Briefer | |
| 4,961,055 A * | 10/1990 | Habib et al. | 324/662 |
| 5,023,966 A | 6/1991 | Eilersen | |
| 5,024,099 A | 6/1991 | Lee | |
| 5,078,220 A | 1/1992 | Briefer | |
| 5,115,676 A | 5/1992 | Lee | |
| 5,150,275 A | 9/1992 | Lee et al. | |
| 5,194,819 A | 3/1993 | Briefer | |
| 5,302,894 A | 4/1994 | Hrubes | |
| 5,442,962 A | 8/1995 | Lee | |
| 5,542,300 A | 8/1996 | Lee | |
| 5,604,315 A | 2/1997 | Briefer et al. | |
| 5,705,751 A | 1/1998 | Briefer et al. | |
| 5,798,462 A | 8/1998 | Briefer et al. | |
| 5,939,639 A | 8/1999 | Lethbridge | |
| 6,014,800 A | 1/2000 | Lee | |
| 6,019,002 A | 2/2000 | Lee | |
| 6,026,694 A | 2/2000 | Gray | |
| 6,079,282 A | 6/2000 | Lanter | |
| 6,180,892 B1 | 1/2001 | Li | |
| 6,191,722 B1 | 2/2001 | Briefer | |
| 6,205,861 B1 | 3/2001 | Lee | |
| 6,257,068 B1 | 7/2001 | Briefer et al. | |
| 6,316,948 B1 | 11/2001 | Briefer | |
| 6,496,019 B1 | 12/2002 | Briefer | |
| 6,513,388 B1 * | 2/2003 | Oja et al. | 73/777 |
| 6,532,834 B1 | 3/2003 | Pinto et al. | |
| 6,718,827 B1 | 4/2004 | Lee et al. | |
| 6,789,429 B2 | 9/2004 | Pinto et al. | |
| 6,823,747 B2 * | 11/2004 | Hasegawa et al. | 73/862.52 |
| 7,047,823 B2 * | 5/2006 | Dallenbach et al. | 73/780 |
| 7,187,185 B2 * | 3/2007 | Dallenbach et al. | 324/662 |
| 2002/0063688 A1 | 5/2002 | Shaw et al. | |
| 2002/0191029 A1 | 12/2002 | Gillespie et al. | |
| 2003/0062889 A1 | 4/2003 | Ely et al. | |
| 2003/0156098 A1 | 8/2003 | Shaw et al. | |
| 2003/0160808 A1 | 8/2003 | Foote et al. | |
| 2004/0159158 A1 * | 8/2004 | Forster | 73/718 |
| 2004/0169594 A1 | 9/2004 | Ely et al. | |
| 2004/0178997 A1 | 9/2004 | Gillespie et al. | |
| 2004/0252109 A1 | 12/2004 | Trent | |
| 2005/0021269 A1 | 1/2005 | Ely et al. | |
| 2005/0024341 A1 | 2/2005 | Gillespie et al. | |
| 2005/0061082 A1 * | 3/2005 | Dallenbach et al. | 73/780 |
| 2005/0066742 A1 | 3/2005 | Eilersen | |
| 2005/0132820 A1 | 6/2005 | Eilersen | |
| 2005/0156881 A1 | 7/2005 | Trent | |
| 2005/0168489 A1 | 8/2005 | Ausbeck | |
| 2005/0171714 A1 | 8/2005 | Ely et al. | |
| 2006/0066319 A1 * | 3/2006 | Dallenbach et al. | 324/662 |
| 2006/0096384 A1 * | 5/2006 | Harish et al. | 73/780 |
| 2006/0267321 A1 * | 11/2006 | Harish et al. | 280/735 |

FOREIGN PATENT DOCUMENTS

| | | |
|---|---|---|
| DE | 4420691 | 1/1996 |
| EP | 0074574 A1 | 3/1983 |
| EP | 0131024 B1 | 10/1986 |
| EP | 0335385 A3 | 10/1989 |
| EP | 0340190 A1 | 11/1989 |
| EP | 0412926 B1 | 2/1991 |
| EP | 04129261 A1 | 2/1991 |
| EP | 0431067 A4 | 6/1991 |
| EP | 0438413 A4 | 7/1991 |
| EP | 0340190 B1 | 7/1992 |
| EP | 0500783 A4 | 9/1992 |
| EP | 0438413 B1 | 3/1993 |
| EP | 0714505 A4 | 6/1996 |
| EP | 0500783 B1 | 10/1996 |
| EP | 0741906 A4 | 11/1996 |
| EP | 0830577 A4 | 3/1998 |
| EP | 0969287 A2 | 1/2000 |
| EP | 0741906 B1 | 6/2000 |
| EP | 1038161 A4 | 9/2000 |
| EP | 0714505 B1 | 2/2001 |
| EP | 1117052 A1 | 7/2001 |
| EP | 0969287 A3 | 1/2003 |
| EP | 1038161 B1 | 5/2003 |
| EP | 1386173 B1 | 10/2004 |
| EP | 1451538 B1 | 8/2005 |
| FR | 2102161 | 7/1972 |
| JP | 56114404 A | 9/1981 |
| JP | 59022404 A | 2/1984 |
| JP | 61077733 | 4/1986 |
| WO | WO-8402780 A1 | 7/1984 |
| WO | WO-02075331 A1 | 9/2002 |
| WO | WO-02077593 A1 | 10/2002 |
| WO | WO-03048700 A2 | 6/2003 |
| WO | WO-03048700 A3 | 6/2003 |
| WO | WO-2006039236 A2 | 4/2006 |

OTHER PUBLICATIONS

"Model MCL Internally Amplified Miniature Tension/Compression Load Cell", http://www.rdpelectrosense.com/load/mcl.htm, 3 pages.

"Weighing Systems: Scales, Balances and Load Cells:Setra", *Setra Weighing Systems Division;* http://www.setra.com/wei/index/htm, 2 Pages.

\* cited by examiner

GAP-CHANGE SENSING THROUGH CAPACITIVE TECHNIQUES

FIELD OF TECHNOLOGY

This disclosure relates generally to the technical fields of measuring devices and, in one embodiment, to gap-change sensing through capacitive techniques.

BACKGROUND

A load cell may be a device (e.g., a transducer) that converts a force to a differential signal (e.g., a differential electric signal). The load cell may be used for a variety of industrial applications (e.g., a scale, a truck weigh station, a tension measuring system, a force measurement system, a load measurement system, etc.) The load cell may be created using a strain gauge. The strain gauge can be used to measure deformation (e.g., strain) of an object. The strain gauge may include a flexible backing which supports a metallic foil pattern etched onto the flexible backing. As the object is deformed, the metallic foil pattern is deformed, causing its electrical resistance to change.

The strain gauge can be connected with other strain gauges to form a load cell in a Wheatstone-bridge configuration (e.g., constructed from four strain gauges, one of which has an unknown value, one of which is variable, and two of which are fixed and equal, connected as the sides of a square). When an input voltage is applied to the load cell in the Wheatstone-bridge configuration, an output may become a voltage proportional to the force on the load cell. The output may require amplification (e.g., 125×) by an amplifier before it can be read by a user (e.g., because the raw output of the Wheatstone-bridge configuration may only be a few milli-volts). In addition, the load cell in the Wheatstone-bridge configuration may consume a significant amount of power when in operation (e.g., in milli-watts of power).

Manufacturing the load cell in the Wheatstone-bridge configuration may involve a series of operations (e.g., precision machining, attaching strain gauges, match strain gauges, environmental protection techniques, and/or temperature compensation in signal conditioning circuitry, etc.). These operations may add complexity that may deliver a yield rate of only 60%, and may allow a particular design of the load cell to only operate for a limited range (e.g., between 10-5,000 lbs.) of measurement. In addition, constraints of the Wheatstone-bridge configuration may permit only a limited number of form factors (e.g., an s-type form factor and/or a single point form factor, etc.) to achieve desired properties of the load cell. The complexity of various operations to manufacture and use load cell may drive cots up (e.g., hundreds and thousands of dollars) for many industrial applications.

SUMMARY

A gap-change sensing through capacitive techniques is disclosed. In one aspect, an apparatus includes a first conductive surface and a second conductive surface substantially parallel to the first conductive surface, and a sensor to generate a measurement based on a change in a distance between the first conductive surface and the second conductive surface. The change in the distance may be caused by a deflection of the first conductive surface with respect to the second conductive surface, and the deflection may be a compressive force and/or an expansive force. The change in the distance may caused by a change in thickness of a spacer between the first conductive surface and/or the second conductive surface.

The sensor may apply an algorithm that converts a change in capacitance to a change in voltage and/or a change in frequency to generate the measurement. The measurement may be of a force applied to a surface above the first conductive surface with respect to the second conductive surface. The change in the distance may be caused by a load applied to the surface above the first conductive surface and/or the second conductive surface. The first conductive surface and the second conductive surface may form a sensor capacitor (e.g., a variable capacitor), and a change in capacitance of the sensor capacitor may be inversely proportional to the change in the distance between the first conductive surface and the second conductive surface.

A reference capacitor associated with the apparatus may enable the sensor to adjust (e.g., compensate for) the measurement based on one or more environmental conditions (e.g., humidity in a gap between the first conductive surface and the second conductive surface, a temperature of the apparatus, and/or an air pressure of an environment surrounding the apparatus, etc.). The first conductive surface and/or the second conductive surface may be fabricated in any geometric shape, including a rectangular shape, an oval shape, and/or a shape having sides that are not all the same length. The first conductive surface and the second conductive surface may be painted on any number of nonconductive printed circuit boards forming the apparatus.

In another aspect, an apparatus includes a reference capacitor whose capacitance changes based on an environmental condition surrounding the apparatus, a sensor capacitor whose capacitance changes based on a deflection of a plate forming the sensor capacitor and/or the environmental condition, and a circuit to generate a measurement after removing an effect of the environmental condition from a capacitance of the sensor capacitor. A housing may be included that encompasses the reference capacitor, the sensor capacitor, and the circuit.

The plate(s) experiencing the deflection may be integrated in the housing. The housing may be formed by metal plates that are each laser etched and/or bonded together to create the housing. The housing may be formed by a single metal block that may be milled to form the housing. The deflection of plate(s) forming the sensor capacitor may be caused by a load applied to the housing, and the measurement may be of a force (e.g., the force may be caused by a load) applied to the housing. A shielding spacer between the reference capacitor and a bottom of the housing may minimize an effect of a stray capacitance affecting the measurement and a height of the shielding spacer may at least ten times larger than a plate spacer between plates of the reference capacitor and between plates of the sensor capacitor.

An area of each plate forming the reference capacitor may be at least ten times larger than an area of each plate forming the sensor capacitor to reduce the amount of amplification required in generating the measurement. The circuit may include a wireless transmitter and a wireless receiver and the apparatus may communicate through a network to a data processing system that analyzes data generated by various operations of the apparatus.

In yet another aspect, a method includes automatically generating a measurement based on a change in a distance between a first conductive surface and a second conductive surface forming a variable capacitor and communicating the measurement to a data processing system associated with the variable capacitor. The change in the distance may be caused by a deflection of the first conductive surface (e.g., may be a compressive force and/or an expansive force) with respect to the second conductive surface. The method may include adjusting the measurement based on at least one environmental condition by analyzing data of a reference capacitor. The method may include fabricating the variable capacitor and the reference capacitor in any geometric shape. The method may include painting the first conductive surface and the second conductive surface on nonconductive printed circuit boards. The method may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Gap-change sensing through capacitive techniques is disclosed. In the following description, for purposes of explanation, numerous specific details are set forth in order to provide a thorough understanding of the various embodiments. It will be evident, however, to one skilled in the art that the various embodiments may be practiced without these specific details. An example embodiment provides methods and systems to automatically generate a measurement based on a change in a distance between a first conductive surface and a second conductive surface forming a sensor capacitor. A reference capacitor may be used to adjust the measurement based on at least one environmental condition.

In addition, in another embodiment, a method may include communicating the measurement to a data processing system associated with the sensor capacitor. Also, the method may be in a form of a machine-readable medium embodying a set of instructions that, when executed by a machine, cause the machine to perform any method disclosed herein. Example embodiments of a method and a system, as described below, may be used to provide a high-accuracy, low-cost, load sensing devices (e.g., load sensors, pressure sensors, etc.). It will be appreciated that the various embodiments discussed herein may/may not be the same embodiment, and may be grouped into various other embodiments not explicitly disclosed herein.

Figure 1:
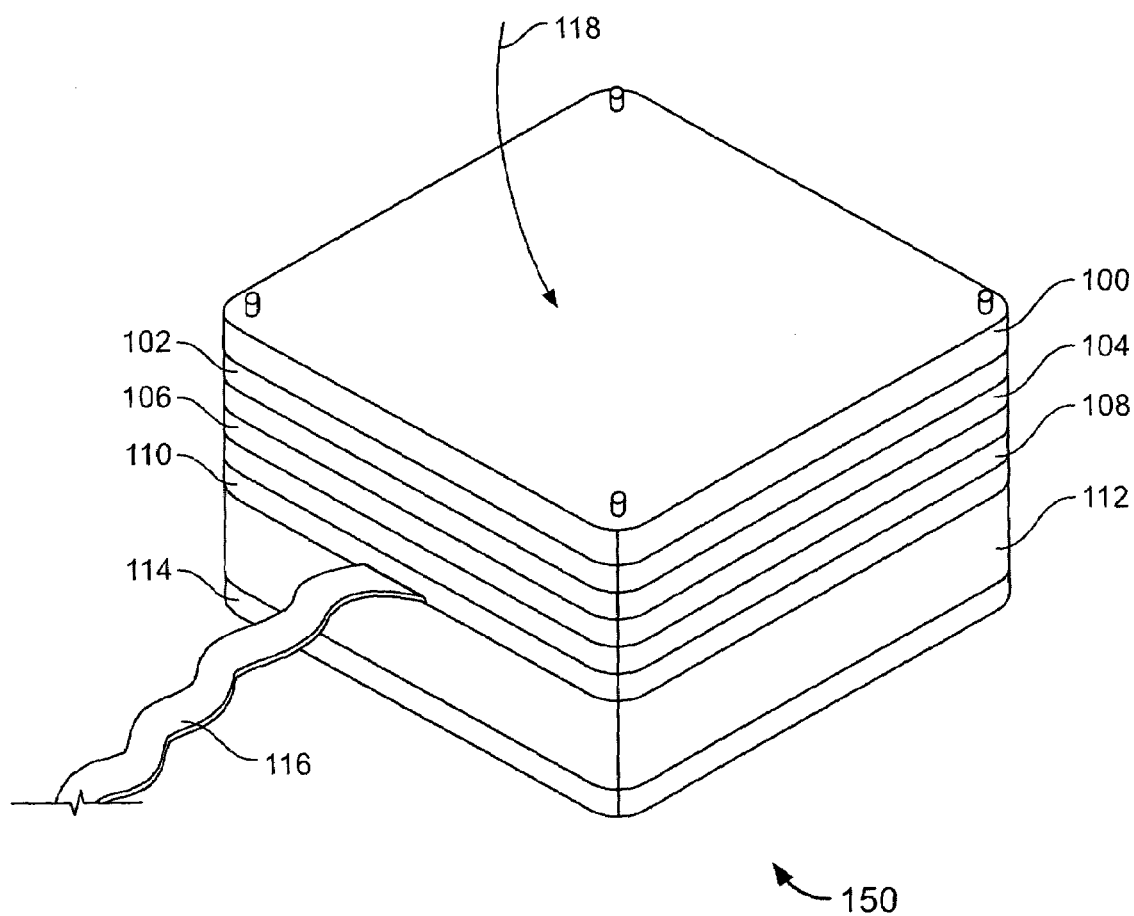
FIG. 1 is a three-dimensional view of a stacked device having a sensor capacitor and a reference capacitor, according to one embodiment.
Figure 6:
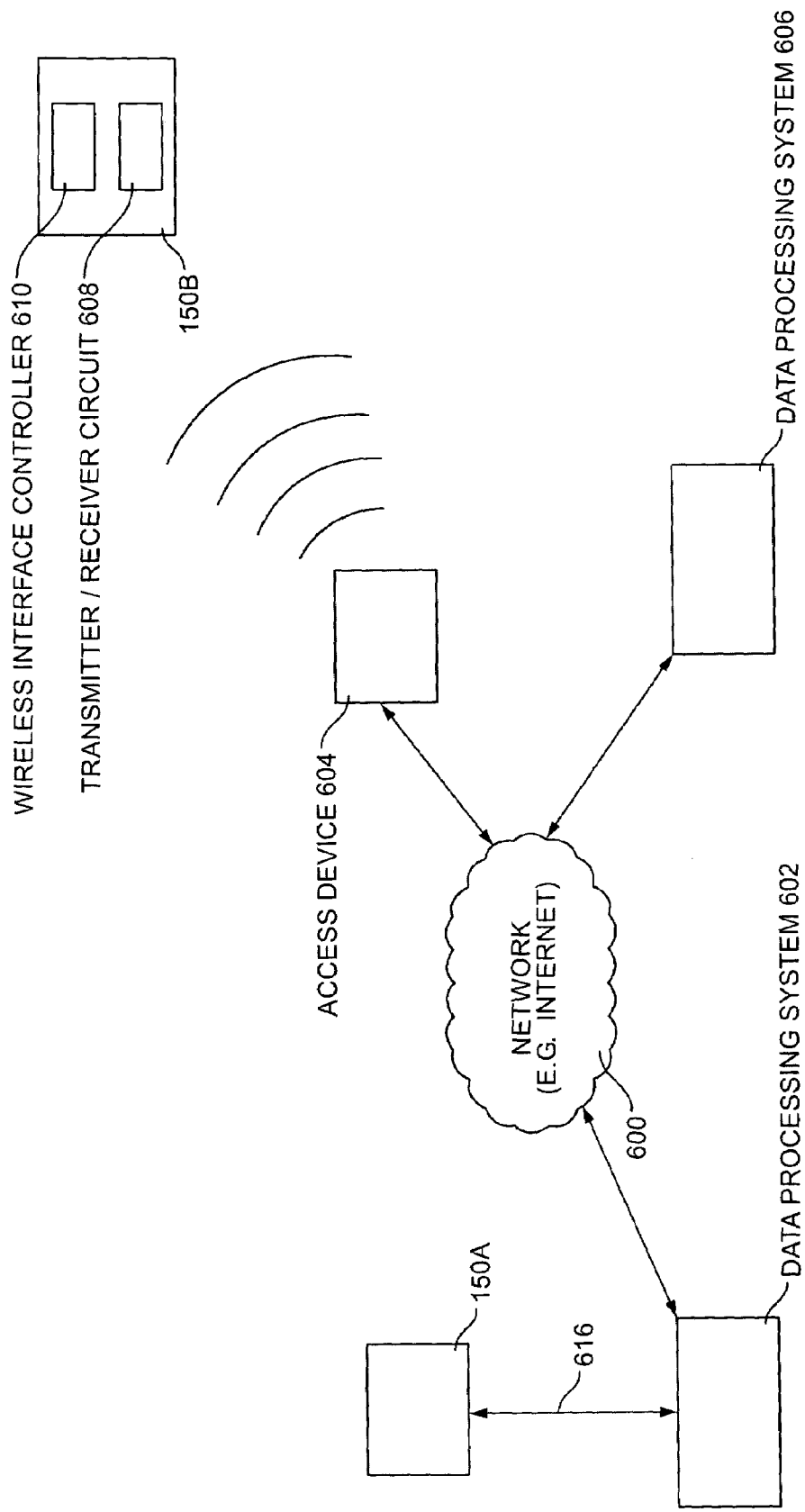
FIG. 6 is a network enabled view of the device of FIG. 1, according to one embodiment.
Figure 8:
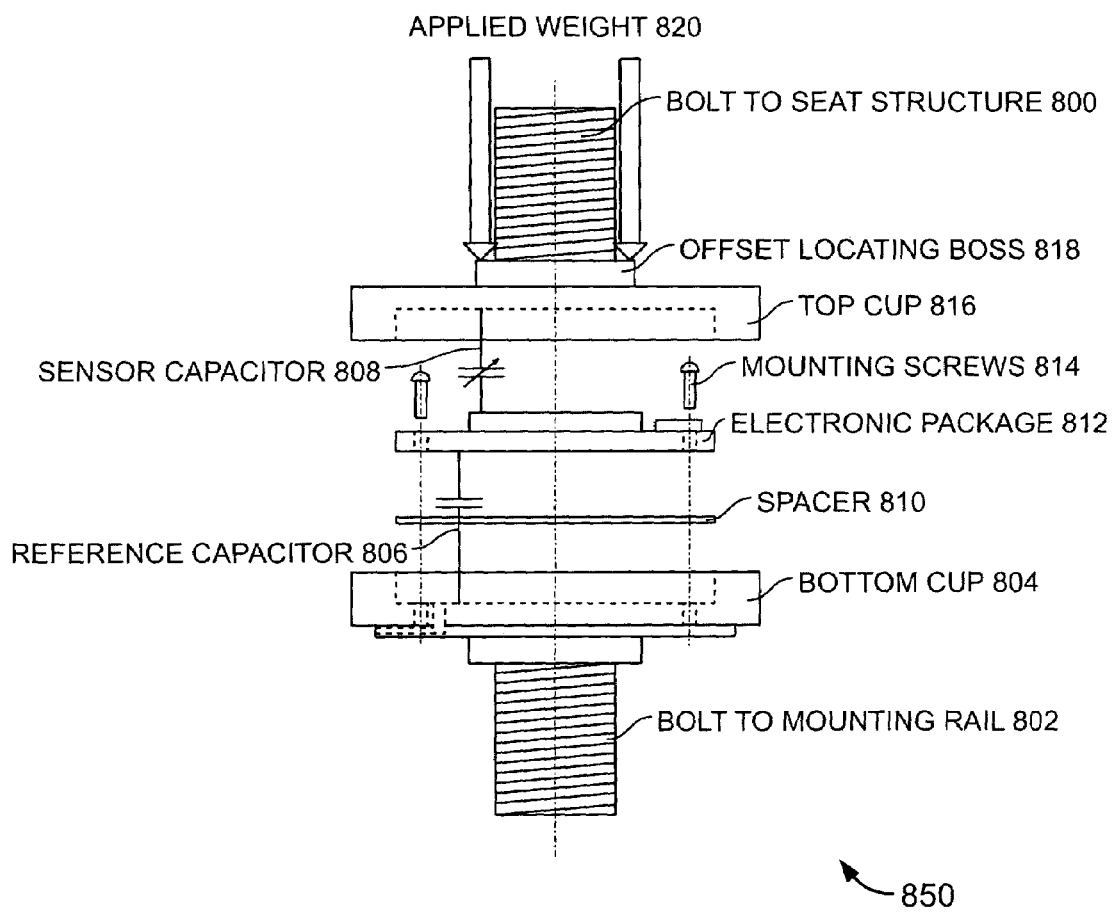
FIG. 8 is a seat device having a sensor capacitor and a reference capacitor, according to one embodiment.

FIG. 1 is a three-dimensional view of a stacked device 150 having a sensor capacitor (e.g., a sensor capacitor 808 as illustrated in FIG. 8) and a reference capacitor (e.g., a reference capacitor 806 as illustrated in FIG. 8), according to one embodiment. The stacked device 150 includes a top layer 100, a printed circuit board 102, a spacer 104, a printed circuit board 106, a spacer 108, a printed circuit board 110, a shielding spacer 112 (e.g., the shielding spacer may be any type of spacer), and a bottom layer 114. A cable 116 (e.g., an interface cable) may connect the stacked device 150 to a data processing system (e.g., the data processing system 602 as illustrated in FIG. 6). In addition, a force 118 (e.g., a load, a weight, a pressure, etc.) may be applied to the top layer 100 as illustrated in FIG. 1. The various components of the stacked device 150 are best understood with reference to FIG. 2A-2G.

Figure 2A:
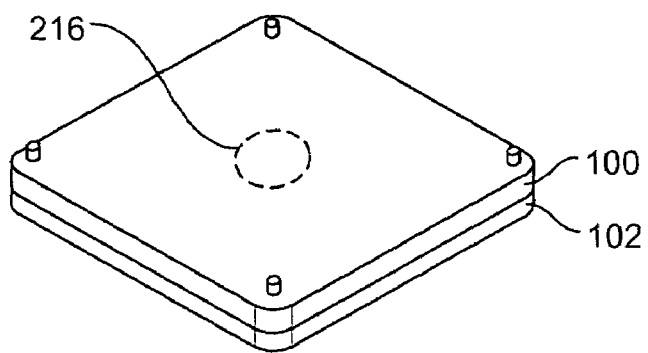
FIGS. 2A-2G are exploded views of the stacked device having the sensor capacitor and the reference capacitor of FIG. 1, according to one embodiment.

FIGS. 2A-2G are exploded views of the stacked device 150 of FIG. 1. FIG. 2A illustrates the top layer 100 and the printed circuit board 102. The top layer 100 may be created from a material such as aluminum, steel, and/or a plastic, etc. The printed circuit board 102 includes a conductive surface 216. The conductive surface may be painted (e.g., sputtered, coated, etc.) on the printed circuit board 102. The printed circuit board 102 may be coupled (e.g., screwed onto, bonded, etched, glued, affixed, etc.) to the top layer 100 as illustrated in FIG. 2A so that when the force 118 (e.g., as illustrated in FIG. 1) is applied to the top layer 100, the top layer 100, the printed circuit board 102, and the conductive surface 216 may deflect (e.g., push inward into the stacked device 150 in reaction to the force 118).

Figure 2B:
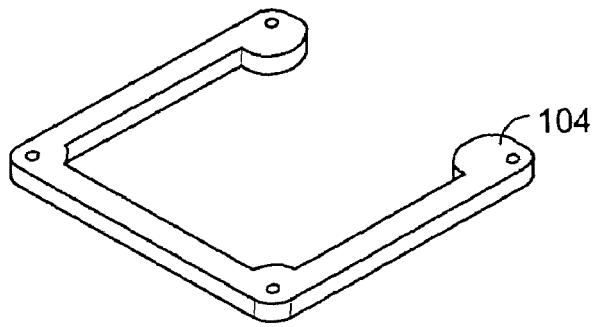
Figure 2C:
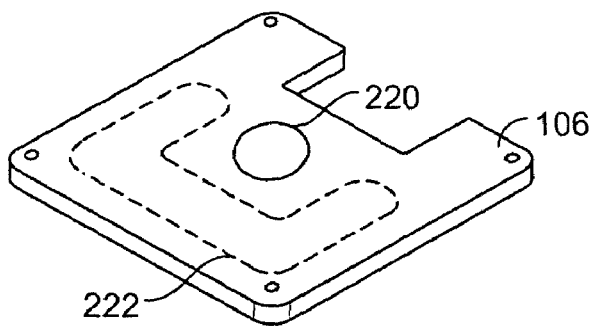

The deflection of the conductive surface 216 may cause a change in capacitance of a sensor capacitor (e.g., the sensor capacitor may formed by the conductive surface 216 and the conductive surface 220 separated by the spacer 104 as illustrated in FIG. 2A, FIG. 2B, and FIG. 2C). A change in distance may be caused by the deflection of the conductive surface 216 with respect to the conductive surface 220 and may be a compressive and/or an expansive force. In one embodiment, the conductive surface 216 and the conductive surface 220 are substantially parallel to each other and have the same physical area and/or thickness. A change in capacitance of the sensor capacitor may be inversely proportional to the change in the distance between the conductive surface 216 and the conductive surface 220 in one embodiment.

FIG. 2B is a view of the spacer 104 of the stacked device 150 of FIG. 1. The spacer 104 may be created from an insulating material (e.g., a plastic, a polymer, a foam, etc.). The spacer 104 may create a gap between the conductive surface 216 and the conductive surface 220. The gap can be filled with air or any other gas (e.g., an inert gas). In one embodiment, the spacer 104 is rigid and does not deflect when the force 118 (e.g., as illustrated in FIG. 1) is applied to the top layer 100. In another embodiment, the spacer 104 expands and/or contracts when the force 118 is applied to the top layer 100 because a pressure of the spacer 104 increases and/or decreases when the force 118 is applied to the top layer 100.

FIG. 2C is a view of the printed circuit board 106 (e.g., a non-conductive material). In the embodiment illustrated in FIG. 2C, a conductive surface 220 is painted (e.g., coated, sputtered, etc.) on the printed circuit board 106 on one side. In addition, a conductive surface 220 may be painted on the other side of the printed circuit board 106 as illustrated in FIG. 2C. In alternate embodiments, the conductive surface 220 and the conductive surface 222 may be separate layers than the printed circuit board 106 (e.g., different layers above and/or below the printed circuit board 106).

Figure 2D:
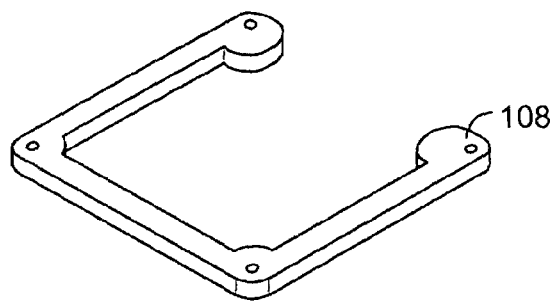
Figure 2E:
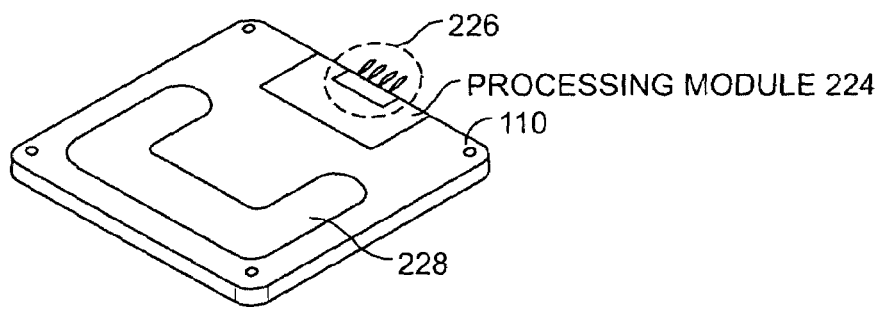

The conductive surface 222 as illustrated in FIG. 2C and the conductive surface 228 as illustrated in FIG. 2E may be separated by the spacer 108 as illustrated in FIG. 2D. The conductive surface 222 and the conductive surface 228 may form a reference capacitor (e.g., similar to the reference capacitor 806 of FIG. 8) according to one embodiment. Since the conductive surface 222 and the conductive surface 228 may not alter positions with respect to each other when the force 118 is applied to the top layer 100, their capacitance may not change (e.g., capacitance is calculated as "capacitance=(dielectric constant multiplied by area of overlap) divided by (distance between surfaces)") in response to the applied force 118.

As such, the reference capacitor formed by the conductive surface 222 and the conductive surface 228 may experience a change in capacitance only for environmental factors (e.g., humidity in a gap between the first conductive surface and the second conductive surface, a temperature of the stacked device 150, and an air pressure of an environment surrounding the stacked device 150, etc.). Therefore, the effect of these environmental conditions can be removed from a measurement of a change in capacitance of the sensor capacitor (e.g. formed by the conductive surface 216 and the conductive surface 220) when the force 118 is applied to the stacked device 150 to more accurately determine a change in capacitance of the sensor capacitor.

The surface area of the conductive surface 222 and the conductive surface 228 may be at least ten times larger than an area of each plate forming the sensor capacitor (e.g., the conductive surface 116 and the conductive surface 220) to reduce the amount of amplification required when generating a measurement of the force 118 applied to the top layer 100 (e.g., using a processing module 224 as illustrated in FIG. 2E) in one embodiment. The processing module 224 of FIG. 2E may include a connector 226 that connects the stacked device 150 (e.g., as illustrated in FIG. 1) to the data processing system 602 (e.g., as illustrated in FIG. 6) through the cable 116 (e.g., as illustrated in FIG. 1). The processing module 224 may be used to generate a measurement (e.g., by following the operations illustrated in FIG. 7) based on a change in a distance between the conductive surface 216 of FIG. 2A and the conductive surface 220 of FIG. 2C. In addition, the processing module 224 may generate a measurement of the sensor capacitor after removing an effect of the environmental condition from a capacitance of the sensor capacitor (e.g., by subtracting the changes in the reference capacitor, which may be only affected by environmental conditions).

Figure 2F:
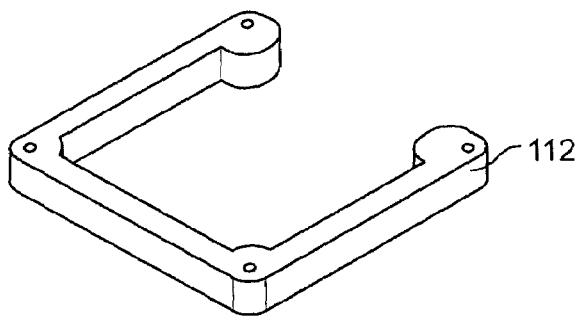
Figure 2G:
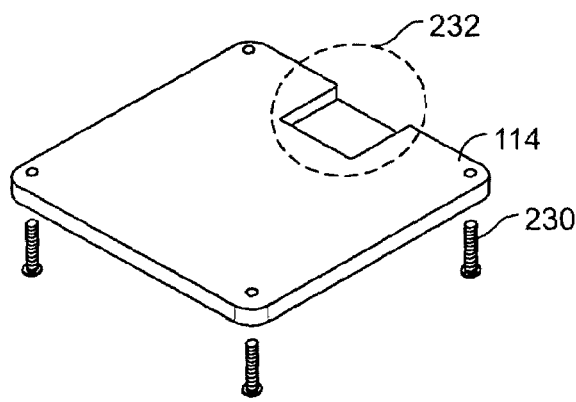

The shielding spacer 112 as illustrated in FIG. 2F may separate the printed circuit board 110 from the bottom layer 114 (e.g., to minimize an effect of a stray capacitance affecting the measurement). In one embodiment, a height of the shielding spacer 112 may be at least ten times larger than plate spacers (e.g., the spacer 104 and the spacer 108) between plates of the reference capacitor (e.g., the spacer 108) and between plates of the sensor capacitor (e.g., the spacer 104). A bottom plate 114 is illustrated in FIG. 2G. The bottom plate 114 may include an indentation 232 as illustrated in FIG. 2G. The indentation 232 may be located directly below the processing module 224 to allow for the connector 226 to sit in the bottom layer 114. The bottom layer 114 may be made of the same material as the top layer 100 in one embodiment. A set of screws 230 as illustrated in FIG. 2G may physically connect the various components illustrated in FIGS. 2A-2G to each other to form the stacked device 150 in one embodiment (e.g., in alternate embodiments the various components may be welded together, bound together, etc.).

Figure 3:
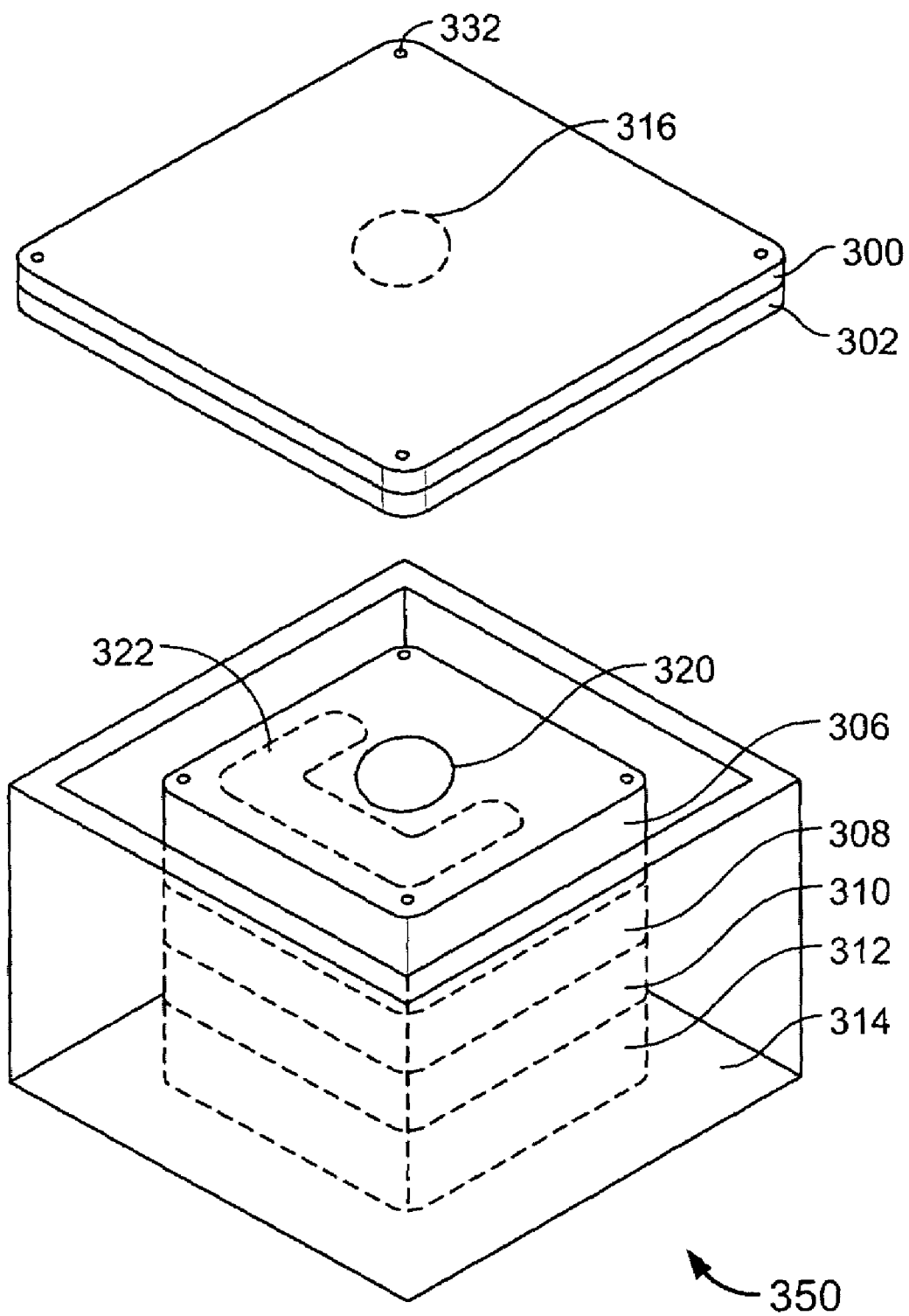
FIG. 3 is a three-dimensional view of a boxed device having a sensor capacitor and a reference capacitor, according to an exemplary embodiment.

FIG. 3 is a three-dimensional view of a boxed device 350 having a sensor capacitor (e.g., a sensor capacitor 808 as illustrated in FIG. 8) and a reference capacitor (e.g., a reference capacitor 806 as illustrated in FIG. 8), according to one embodiment. The boxed device 350 includes a top layer 300, a printed circuit board 302, a printed circuit board 306, a spacer 308, a printed circuit board 310, a shielding spacer 312, and a bottom cup 314. The printed circuit board 306 is illustrated as having a conductive surface 320 (e.g., similar to the conductive surface 220 as illustrated in FIG. 2C) painted on one side, and a conductive surface 322 painted on another side (e.g., similar to the conductive surface 222 as illustrated in FIG. 2C). A conductive surface 316 painted on the printed circuit board 312 and the conductive surface 320 painted on the printed circuit board 306 may form a sensor capacitor (e.g., the sensor capacitor 808 as described in FIG. 8).

Unlike the stacked device 150 of FIG. 1, the boxed device 350 of FIG. 3 does not have a spacer (e.g., the spacer 104) between the printed circuit board 302 and the printed circuit board 306 (e.g., this spacer is not required in FIG. 3 because the bottom cup 314 is higher than the top of the printed circuit board 306 so as to create a gap between the printed circuit board 302 and the printed circuit board 306 when a top (e.g., formed by the coupling of the top layer 300 and the printed circuit board 302) is placed on the bottom cup 314). It should be noted that the bottom cup 314, the top layer 300, and the printed circuit board 302 may have physical dimensions that are larger than the other components (e.g., the printed circuit board 306) forming the boxed device 350. In addition, the top layer 300 and the printed circuit board 302 may be integrated with one another (e.g., bonded, glued, screwed with each other, fastened, etc.). Other embodiments of the boxed device 350 of FIG. 3 may be the same as the embodiments described in FIG. 2A-2G.

Figure 4:
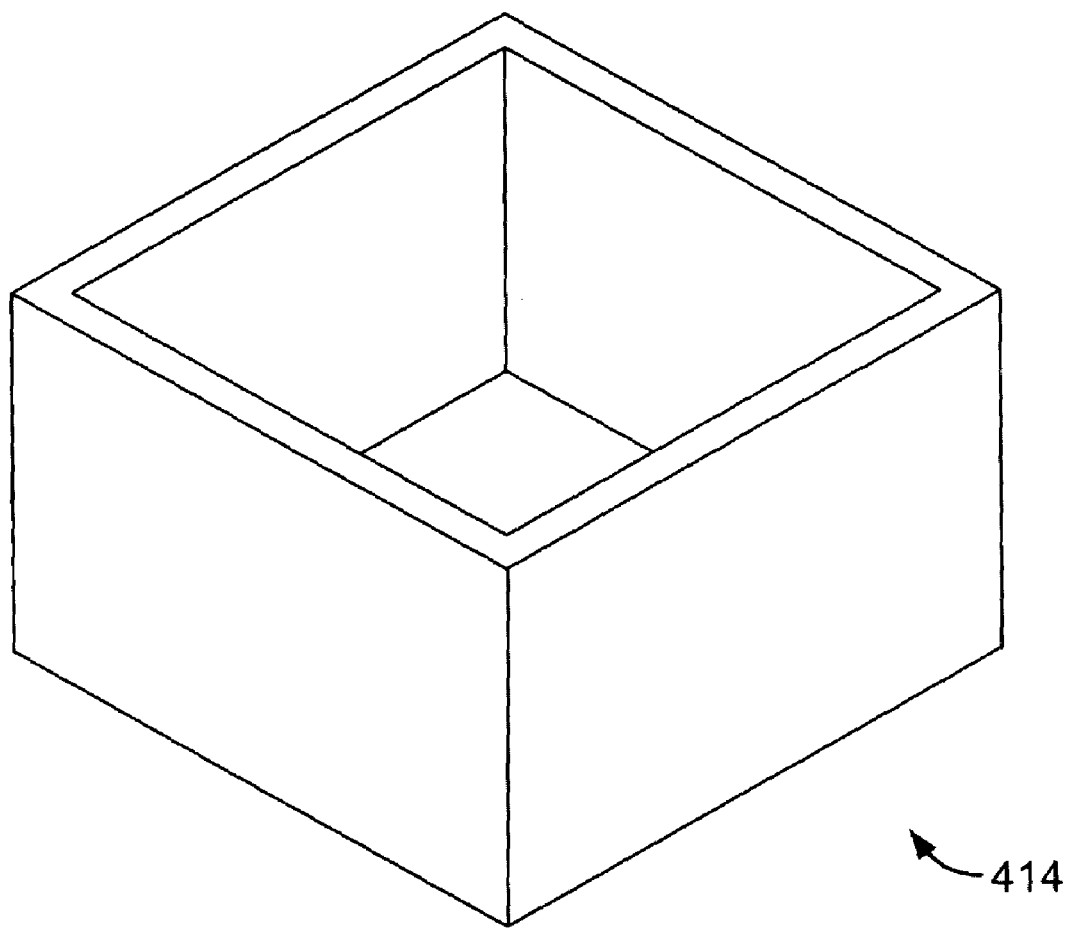
FIG. 4 is a three-dimensional view of a carved material that can be used to encompass the sensor capacitor and the reference capacitor in the boxed device of FIG. 3, according to one embodiment.

FIG. 4 is a three-dimensional view of a carved material that can be used to encompass (e.g., provide a housing to) the sensor capacitor (e.g., the sensor capacitor 808 as illustrated in FIG. 8) and the reference capacitor (e.g., the reference capacitor 806 as illustrated in FIG. 8) in the boxed device 350 of FIG. 3, according to one embodiment. In FIG. 4, a single block (e.g., steel) is used to form a bottom cup 414. In one embodiment, the bottom cup 414 in FIG. 4 replaces the bottom layer 314 of FIG. 3, and encompasses the various structures (e.g., capacitive surfaces/plates, spacers, etc.) between the bottom layer 314 and the top plate 300 as illustrated in FIG. 3. The bottom cup 414 may be formed from a single piece of metal through any process (e.g., involving cutting, milling, etching, and/or drilling, etc.) that maintains the structural and/or tensile integrity of the bottom cup 414. This way, the bottom cup 414 may be able to withstand larger amounts of force (e.g., the force 118 of FIG. 1) by channeling the force downward through the walls of the bottom cup 414.

Figure 5:
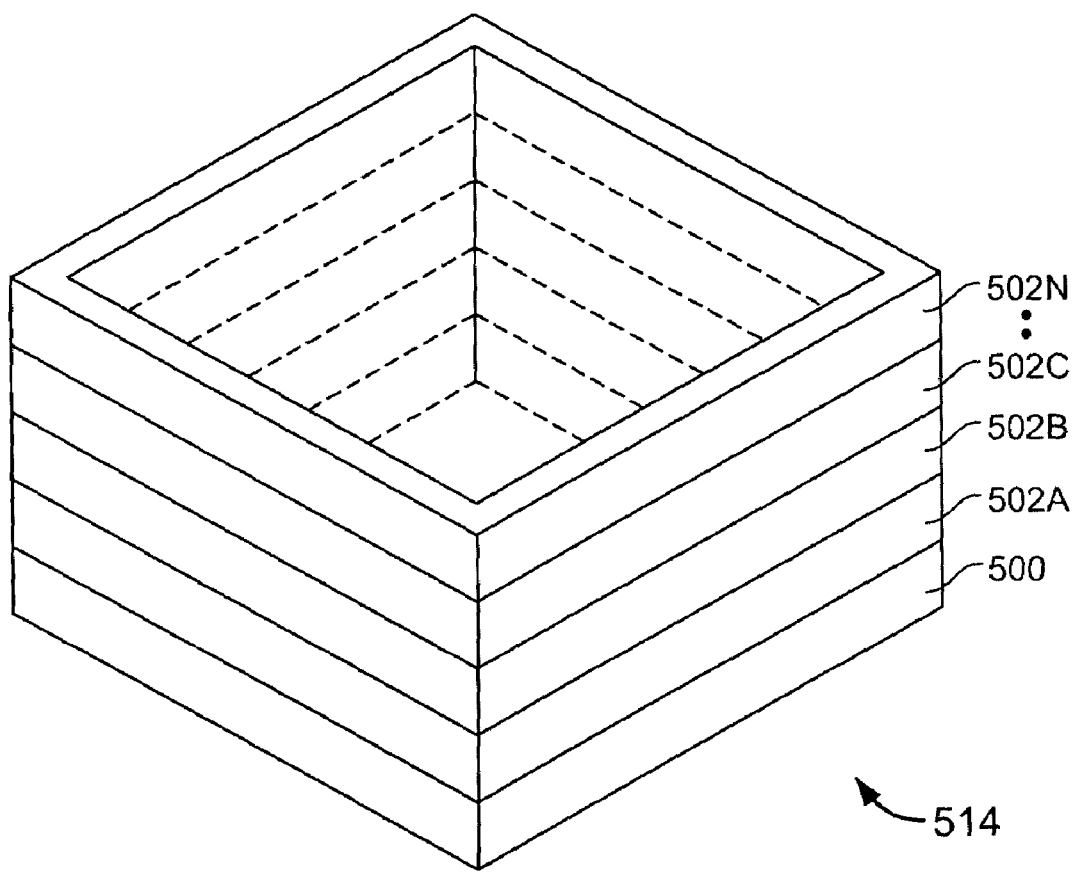
FIG. 5 is a three-dimensional view of multiple layers of a material that can be used to encompass the sensor capacitor and the reference capacitor in the boxed device of FIG. 3, according to one embodiment.

FIG. 5 is a three-dimensional view of a multiple layers of a material that can be used to encompass the sensor capacitor and the reference capacitor in the boxed device 350 of FIG. 3, according to one embodiment. Particularly, FIG. 5 illustrates a bottom cup 514 formed with multiple blocks of material according to one embodiment. A single thin solid metal block may form a bottom layer 500 as illustrated in FIG. 5. In addition, other layers of the bottom cup 514 may be formed from layers (e.g., the layers 502A-502N) each laser cut (e.g., laser etched) and/or patterned (e.g., to form the bottom cup 514 at a cost lower than milling techniques in a single block as may be required in the bottom cup 414 of FIG. 4). For example, the layers 502A-502N may be a standard metal size and/or shape, thereby reducing the cost of fabricating the bottom cup 514.

In one embodiment, the bottom cup 514 in FIG. 5 replaces the bottom layer 314 of FIG. 3, and encompasses the various structures (e.g., capacitive surfaces/plates, spacers, etc.) between the bottom layer 314 and the top plate 300 as illustrated in FIG. 3. Like the embodiment of FIG. 4, the bottom cup 514 of FIG. 5 may be able to withstand larger amounts of force (e.g., the force 118 of FIG. 1) by channeling the force downward through the walls of the bottom cup 514. Furthermore, the bottom cup 514 may be less expensive to manufacture than the bottom cup 414 as described in FIG. 4 because standard machining techniques may be used to manufacture the bottom cup 514.

FIG. 6 is a network enabled view of the device 150 of FIG. 1, according to one embodiment. The first embodiment, a device 150A, is connected to a data processing system 602 through an interface cable ((e.g., the cable 116 of FIG. 1 and/or a cable 616 of FIG. 6). The second device 150B is wirelessly connected to the data processing system 602 through a network 600. In one embodiment, the network 600 is an Internet network. In another embodiment, the network 600 is a local area network. A data processing system 606 may receive data (e.g., output data measuring force and/or load, etc.) from the device 150A and/or the device 150B through the network 600. In one embodiment, the data processing system 606 analyzes data (e.g., measurements) generated by various operation of the device (e.g., the stacked device 150A). An access device 604 (e.g., a device that enables wireless communication between devices forming a wireless network) may provide wireless connectivity to the device 150B. In one embodiment, the device 150B includes a transmitter/receiver circuit 608 and/or a wireless interface controller 610 for enabling the device 150B to wirelessly communicate through the network 600. In one embodiment, the transmitter/receiver circuit 608 and/or the wireless interface controller 610 may be integrated into the processing module 714 of FIG. 7.

Figure 7:
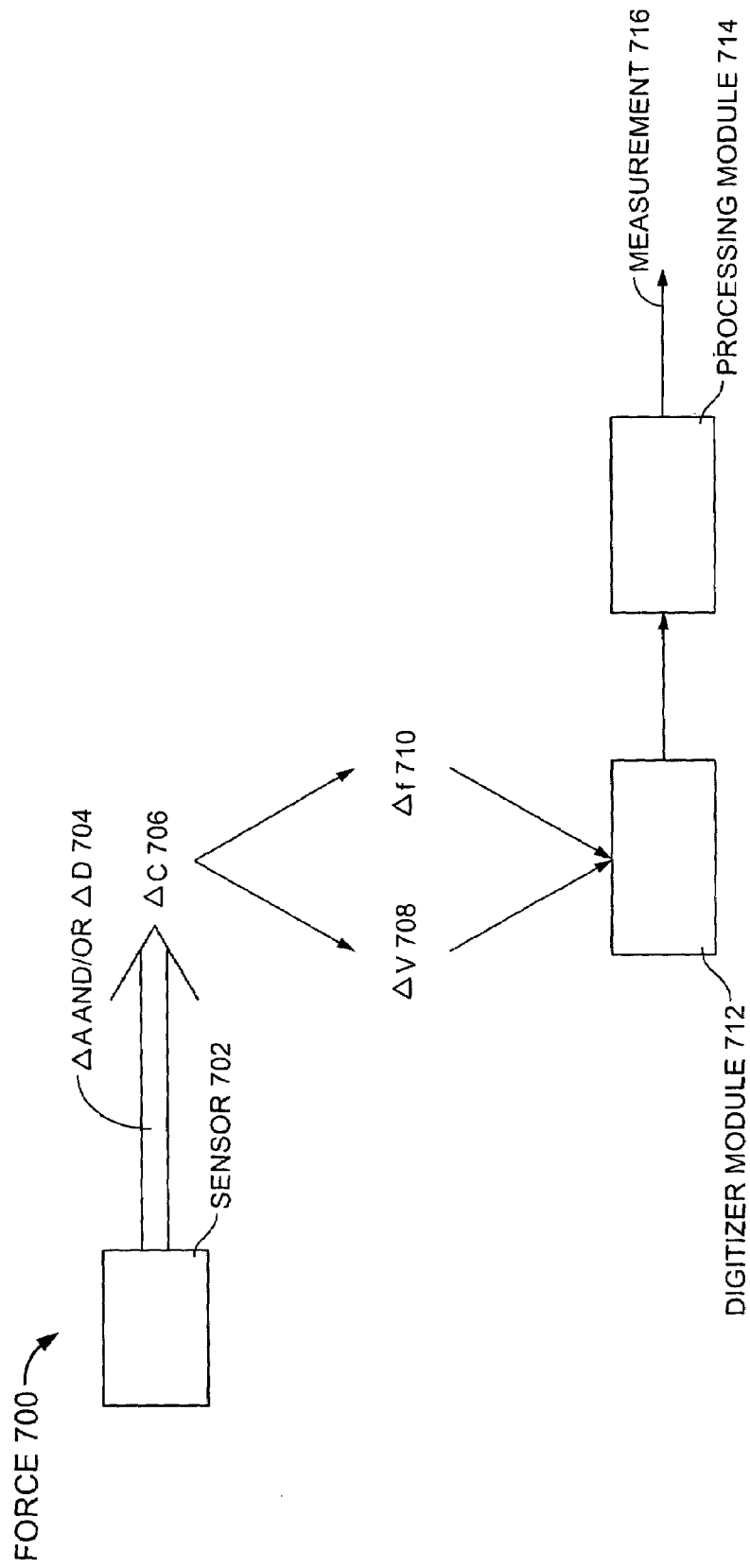
FIG. 7 is a process view of measuring a force 700, according to one embodiment.

FIG. 7 is a process view of measuring a force 700, according to one embodiment. In FIG. 7, a force 700 may be applied to a sensor 702 (e.g., the top layer 102 having the conductive surface 106 of FIG. 1), according to one embodiment. An electronic circuitry (e.g., a software and/or hardware code) may apply an algorithm to measure a change in a distance 704 (e.g., a gap) between plates of the sensor capacitor (e.g., between the conductive surface 216 and the conductive 220 forming the sensor capacitor as illustrated in FIG. 2A and FIG. 2C) when the force 118 of FIG. 1 is applied to a device (e.g., the stacked device 150 and/or the boxed device 350). In an alternate embodiment, a change in area between the plates may be considered rather than a change in the gap.

Next, a change in capacitance 706 may be calculated based on the change in the gap between the plates forming the sensor capacitor (e.g., the top layer 102 having the conductive surface 106 of FIG. 1). The change in capacitance 706, a change in a voltage 708, and/or a change in a frequency 710 may also be calculated to generate a measurement (e.g., an estimation of the force 700 applied to the sensor 702). The change in capacitance 706 data, the change in voltage 708 data, and/or the change in frequency data 710 may be provided to a digitizer module 712 (e.g., an analog-to-digital converter). Finally, the digitizer module 712 may work with a processing module 714 (e.g., a microprocessor which may be integrated in the processing module 224) to convert the change in capacitance 706 data, the change in voltage 708 data, and/or the change in frequency data 710 to a measurement reading 716 (e.g., a measurement of the force 700 applied to the sensor 702).

FIG. 8 is a seat device 850 having the sensor capacitor 808 (e.g., a variable capacitor) and the reference capacitor 806, according to one embodiment. The seat device 850 (e.g., a car seat device, an airplane seat device, etc.) includes a bolt to seat structure 800 and a bolt to mounting rail 802. An applied weight 820 (e.g., a person sitting on a seat in a car) may exert a force on a top cup 816 and on one plate of the sensor capacitor 808. An offset locating boss 818 may provide a junction point between the bolt to seat structure 800 and the top cup 816. The top cup 816 may be similar to the top plate 100 in FIG. 1, and the sensor capacitor 808 may be formed by the conductive surface 216 and the conductive surface 220 as illustrated in FIG. 2A and FIG. 2C. It should be noted that the various conductive surfaces forming the sensor capacitor 808 and the reference capacitor 806 may be fabricated in any geometric shape, including a rectangular shape, an oval shape, and a shape having sides that are not all the same length.

A set of mounting screws 814 may fasten electronic package 812 (having the processing module 224 as illustrated in FIG. 2E) to a spacer 810 and to a bottom cup 804 as illustrated in FIG. 8. The spacer 810 may be located between the reference capacitor 806 and the bottom cup 804, and in one embodiment may be ten times larger than a plate spacer between plates of the reference capacitor 806 and between plates of the sensor capacitor 808.

Figure 9:
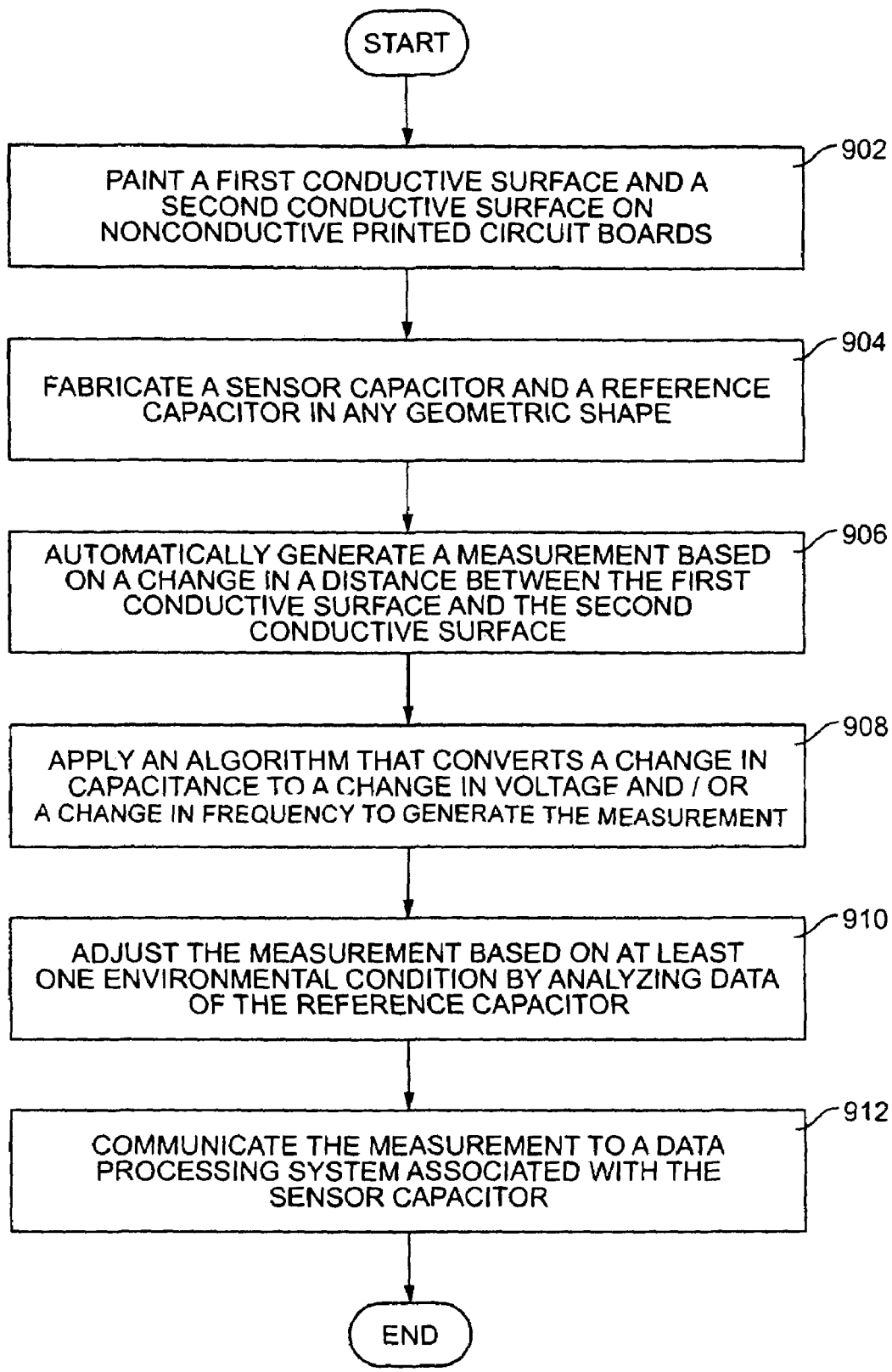
FIG. 9 is a process flow of automatic generation of a measurement based on a change in a distance between a first conductive surface and a second conductive surface forming a sensor capacitor, according to one embodiment.

FIG. 9 is a process flow of automatic generation of a measurement (e.g., using the processing module 224 as illustrated in FIG. 2E) based on a change in a distance between a first conductive surface (e.g., the conductive surface 216 of FIG. 2A) and a second conductive surface (e.g., the conductive surface 220 of FIG. 2C) forming a sensor capacitor (e.g., the sensor capacitor 808 of FIG. 8), according to one embodiment. In operation 902, a first conductive surface (e.g., the conductive surface 216 of FIG. 2A) and second conductive surface (e.g., the conductive surface 220 of FIG. 2C) may be painted on non-conductive printed circuit boards (e.g., the printed circuit board 102 and the printed circuit board 106 respectively).

Then, in operation 904, a sensor capacitor (e.g., the sensor capacitor 808) and a reference capacitor (e.g., the reference capacitor 806) may be fabricated in any geometric shape (e.g., plates of the sensor capacitor and/or the reference capacitor are formed in a rectangular shape, a square shape, a circle shape, etc.). In operation 906, a measurement may be automatically generated based on a change in a distance between the first conductive surface and the second conductive surface (e.g., the distance may change when the force 118 of FIG. 1 is applied on the stacked device 150, the boxed device 350, and/or the seat device 850). In one embodiment, the change in the distance may be caused by a deflection of the first conductive surface (e.g., through compressive force and/or an expansive force by a force 118 of FIG. 1). In alternate embodiments, the change in distance may be caused by a change in thickness in at least one spacer (e.g., the spacer 104 of FIG. 2B) between the first conductive surface and the second conductive surface.

In operation 908, an algorithm (e.g., an iterative algorithm) may be applied that converts a change in capacitance to a change in voltage and/or a change in frequency to generate the measurement. In operation 910, the measurement may be adjusted based on at least one environmental condition by analyzing data of the reference capacitor (e.g., the environmental condition may be humidity, temperature, etc.). The measurement may be communicated to a data processing system (e.g., the data processing system 602 as illustrated in FIG. 6) associated (e.g., either through the cable 616 and/or through the network 600 of FIG. 6) with the sensor capacitor (e.g., the sensor device in the stacked device 150A) in operation 912.

Although the present embodiments have been described with reference to specific example embodiments, it will be evident that various modifications and changes may be made to these embodiments without departing from the broader spirit and scope of the various embodiments. For example, the processing module 224 of FIG. 2E, the transmitter/receiver circuit 608 of FIG. 6, the wireless interface controller 610 of FIG. 6, and/or the processing module 714 of FIG. 7 described herein may be enabled and operated using hardware circuitry (e.g., CMOS based logic circuitry), firmware, software and/or any combination of hardware, firmware, and/or software (e.g., embodied in a machine readable medium).

For example, the digital converter module 712 and/or the processing module 714 may be enabled using software and/or using transistors, logic gates, and electrical circuits (e.g., application specific integrated ASIC circuitry) such as a digital converter circuit and/or a processing circuit. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An apparatus, comprising:
a first conductive surface and a second conductive surface substantially parallel to the first conductive surface;
a sensor to generate a measurement based on a change in a distance between the first conductive surface and the second conductive surface; and
a reference capacitor having a shielding spacer between the reference capacitor and a bottom of the apparatus to minimize an effect of a stray capacitance affecting the measurement to enable the sensor to adjust the measurement based on at least one environmental condition.

2. The apparatus of claim 1 wherein the change in the distance is caused by a deflection of the first conductive surface with respect to the second conductive surface; and wherein the deflection is at least one of a compressive force and an expansive force.

3. The apparatus of claim 1 wherein the change in the distance is caused by a change in thickness of at least one spacer between the first conductive surface and the second conductive surface.

4. The apparatus of claim 1 wherein the sensor applies an algorithm that converts a change in capacitance to at least one of a change in voltage and a change in frequency to generate the measurement.

5. The apparatus of claim 4 wherein the measurement is of a force applied to a surface above the first conductive surface with respect to the second conductive surface.

6. The apparatus of claim 5 wherein the change in the distance is caused by a load applied to the surface above the first conductive surface with respect to the second conductive surface.

7. The apparatus of claim 6 wherein the first conductive surface and the second conductive surface form a sensor capacitor, and wherein a change in capacitance of the sensor capacitor is inversely proportional to the change in the distance between the first conductive surface and the second conductive surface.

8. The apparatus of claim 1 wherein the at least one environmental condition is humidity in a gap between the first conductive surface and the second conductive surface, a temperature of the apparatus, and an air pressure of an environment surrounding the apparatus, and wherein a height of the shielding spacer is at least ten times larger than a plate spacer between plates of the reference capacitor and between plates of the sensor capacitor.

9. The apparatus of claim 1 wherein the first conductive surface and the second conductive surface are fabricated in a geometric shape, comprising at least one of a rectangular shape, an oval shape, and a shape having sides that are not all the same length.

10. An apparatus of claim 1 wherein the first conductive surface and the second conductive surface are painted on a plurality of nonconductive printed circuit boards forming the apparatus.

11. An apparatus, comprising:
a reference capacitor whose capacitance changes based on an environmental condition surrounding the apparatus;
a sensor capacitor whose capacitance changes based on a deflection of at least one plate forming the sensor capacitor and the environmental condition;
a circuit to generate a measurement after removing an effect of the environmental condition from a capacitance of the sensor capacitor; and
a housing that encompasses the reference capacitor, the sensor capacitor, and the circuit, and wherein the at least one plate experiencing the deflection is integrated in the housing, wherein the housing is formed by a plurality of metal plates that are each laser etched and bonded together to create the housing.

12. The apparatus of claim 11 wherein the housing is formed by a single metal block that is milled to form the housing.

13. The apparatus of claim 11 wherein the deflection of the at least one plate forming the sensor capacitor is caused by a load applied to the housing; and wherein the measurement is of a force applied to the housing.

14. The apparatus of claim 13 further comprising a shielding spacer between the reference capacitor and a bottom of the housing to minimize an effect of a stray capacitance affecting the measurement, wherein a height of the shielding spacer is at least ten times larger than a plate spacer between plates of the reference capacitor and between plates of the sensor capacitor.

15. The apparatus of claim 11 wherein an area of each plate forming the reference capacitor is at least ten times larger than an area of each plate forming the sensor capacitor to reduce the amount of amplification required in generating the measurement.

16. The apparatus of claim 11 wherein the circuit includes a wireless transmitter and a wireless receiver and wherein the apparatus communicates through a network with a data processing system that analyzes data generated by various operation of the apparatus.

17. A method, comprising:
automatically generating a measurement based on a change in a distance between a first conductive surface and a second conductive surface forming a variable capacitor;

communicating the measurement to a data processing system associated with the variable capacitor; and adjusting the measurement based on at least one environmental condition by analyzing data of a reference capacitor having a shielding spacer between the reference capacitor and a bottom of a housing to minimize an effect of a stray capacitance affecting the measurement.

18. The method of claim 17 wherein the change in the distance is caused by a deflection of the first conductive surface with respect to the second conductive surface, wherein the deflection is at least one of a compressive force and an expansive force, and, wherein a height of the shielding spacer is larger than a plate spacer between plates of the reference capacitor and between plates of the variable capacitor.

19. The method of claim 17 wherein the change in the distance is caused by a change in thickness of at least one spacer between the first conductive surface and the second conductive surface.

20. The method of claim 17 further comprising applying an algorithm that converts a change in capacitance to at least one of a change in voltage and a change in frequency to generate the measurement, and wherein the measurement is of a force applied to a surface above the first conductive surface with respect to the second conductive surface.

21. The method of claim 20 wherein the change in the distance is caused by a load applied to the surface above the first conductive surface with respect to the second conductive surface.

22. The method of claim 21 wherein a change in capacitance of the variable capacitor is inversely proportional to the change in the distance between the first conductive surface and the second conductive surface.

23. The method of claim 17 wherein the at least one environmental condition is humidity in a gap between the first conductive surface and the second conductive surface, a temperature of the variable capacitor, and an air pressure of an environment surrounding the variable capacitor.

24. The method of claim 23 further comprising fabricating the variable capacitor and the reference capacitor in a geometric shape, comprising at least one of a rectangular shape, an oval shape, and a shape having sides that are not all the same length.

25. An method of claim 17 further comprising painting the first conductive surface and the second conductive surface on a plurality of nonconductive printed circuit boards.

26. A method of claim 17 in a form of a machine-readable medium embodying a set of instructions that, when executed by a machine, cause the machine to perform a method comprising automatically generating a measurement based on a change in a distance between a first conductive surface and a second conductive surface forming a variable capacitor;

communicating the measurement to a data processing system associated with the variable capacitor; and adjusting the measurement based on at least one environmental condition by analyzing data of a reference capacitor having a shielding spacer between the reference capacitor and a bottom of a housing to minimize an effect of a stray capacitance affecting the measurement.

27. An apparatus, comprising:
a reference capacitor whose capacitance changes based on an environmental condition surrounding the apparatus;
a sensor capacitor whose capacitance changes based on a deflection of at least one plate forming the sensor capacitor and the environmental condition;
a circuit to generate a measurement after removing an effect of the environmental condition from a capacitance of the sensor capacitor; and
a shielding spacer between the reference capacitor and a bottom of the housing to minimize an effect of a stray capacitance affecting the measurement, wherein a height of the shielding spacer is at least ten times larger than a plate spacer between plates of the reference capacitor and between plates of the sensor capacitor.

28. The apparatus of claim 27 further comprising a housing that encompasses the reference capacitor, the sensor capacitor, and the circuit, and wherein the at least one plate experiencing the deflection is integrated in the housing.

29. The apparatus of claim 28 wherein the housing is formed by a plurality of metal plates that are each laser etched and bonded together to create the housing.

30. The apparatus of claim 28 wherein the housing is formed by a single metal block that is milled to form the housing.

31. The apparatus of claim 28 wherein the deflection of the at least one plate forming the sensor capacitor is caused by a load applied to the housing; and wherein the measurement is of a force applied to the housing.

32. The apparatus of claim 28 wherein an area of each plate forming the reference capacitor is at least ten times larger than an area of each plate forming the sensor capacitor to reduce the amount of amplification required in generating the measurement.

33. The apparatus of claim 28 wherein the circuit includes a wireless transmitter and a wireless receiver and wherein the apparatus communicates through a network with a data processing system that analyzes data generated by various operation of the apparatus.

* * * * *